United States Patent
Choi et al.

(10) Patent No.: US 8,185,055 B2
(45) Date of Patent: May 22, 2012

(54) APPARATUS FOR DETERMINING INTERFERENCE USING CYCLIC PREFIX AND METHOD THEREOF

(75) Inventors: Hyun Ho Choi, Gyeonggi-do (KR); Hyo Sun Hwang, Seoul (KR); Tae In Hyon, Gyeonggi-do (KR); Kyung Hun Jang, Gyeonggi-do (KR); In Sun Lee, Seoul (KR); Hyun Gi Ahn, Incheon (KR); Yong Ho Cho, Chungcheongnam-do (KR); Dong Jo Park, Daejeon (KR); Jung Hyun Park, Busan (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 1113 days.

(21) Appl. No.: 12/042,521

(22) Filed: Mar. 5, 2008

(65) Prior Publication Data
US 2009/0111385 A1    Apr. 30, 2009

(30) Foreign Application Priority Data
Oct. 25, 2007    (KR) .................. 10-2007-0108027

(51) Int. Cl.
*H04B 1/00* (2006.01)
*H04B 15/00* (2006.01)
*H04B 17/00* (2006.01)

(52) U.S. Cl. .................................. 455/63.1; 455/67.13
(58) Field of Classification Search ............. 455/67.13, 455/67.11, 63.1, 63.2, 226.1, 114.2, 115.1, 455/278.1, 296; 375/260
See application file for complete search history.

(56) References Cited

U.S. PATENT DOCUMENTS

| 6,549,592 B1* | 4/2003 | Jones ........................ 375/354 |
| 2004/0190638 A1 | 9/2004 | Blasco Claret et al. |
| 2004/0247020 A1 | 12/2004 | Mills et al. |
| 2005/0105659 A1 | 5/2005 | Sheu et al. |
| 2005/0157802 A1 | 7/2005 | Park et al. |
| 2006/0087961 A1 | 4/2006 | Chang et al. |
| 2006/0239367 A1 | 10/2006 | Wilhelmsson et al. |

FOREIGN PATENT DOCUMENTS

| KR | 2006-2173 | 1/2006 |
| KR | 2006-84524 | 7/2006 |

* cited by examiner

*Primary Examiner* — Eugene Yun
(74) *Attorney, Agent, or Firm* — NSIP Law

(57) ABSTRACT

An interference determination apparatus, including a signal receiver to receive a first signal of a primary network and a second signal of a secondary network; a correlator to compute a correlation value of a first cyclic prefix included in the first signal and a correlation value of a second cyclic prefix included in the second signal; and an interference determination unit to determine an interference level or whether the interference occurs between the primary network and the secondary network, using the correlation value of the first cyclic prefix and the correlation value of the second cyclic prefix.

17 Claims, 10 Drawing Sheets

APPARATUS FOR DETERMINING INTERFERENCE USING CYCLIC PREFIX AND METHOD THEREOF

CROSS-REFERENCE TO RELATED APPLICATION

This application claims the benefit of Korean Patent Application No. 2007-108027, filed in the Korean Intellectual Property Office on Oct. 25, 2007, the disclosure of which is incorporated herein by reference.

BACKGROUND OF THE INVENTION

1. Field of the Invention

Aspects of the present invention relate to an apparatus and method of determining an interference that can determine an interference level or whether an interference occurs using a cognitive radio technology.

2. Description of the Related Art

Currently, research is being conducted regarding technologies capable of using limited frequency resources. One technology receiving much attention is cognitive radio technology. Cognitive radio technology recycles limited frequency resources and thereby more effectively uses frequency resources. According to the cognitive radio technology, a communication apparatus belonging to a secondary network periodically or non-periodically senses frequency resources that are used in a primary network, identifies an available frequency resource, and transmits and receives data using the available frequency resource.

With respect to the available frequency resource, the primary network has priority over the secondary network. When there is a probability that a signal of the secondary network may conflict with a signal of the primary network, the communication apparatus of the secondary network must suspend a communication operation or change a frequency band in use.

The communication apparatus of the secondary network should determine whether the signal of the primary network exists, or an interference level of the interference that is caused by the signal of the primary network. A communication apparatus of the primary network should determine whether the signal of the secondary network exists.

Current communication systems generally use an orthogonal frequency division multiplexing (OFDM) scheme. Accordingly, there is a need for an interference determination apparatus and method for using a cognitive radio technology in communication systems using the OFDM scheme.

SUMMARY OF THE INVENTION

According to an aspect of the present invention, an apparatus to determine an interference between a primary network and a secondary network is provided. The apparatus includes a signal receiver to receive a first signal of the primary network and a second signal of the secondary network; a correlator to compute a correlation value of a first cyclic prefix included in the first signal and a correlation value of a second cyclic prefix included in the second signal; and an interference determination unit to determine an interference level or whether the interference occurs between the primary network and the secondary network based on the correlation value of the first cyclic prefix and the correlation value of the second cyclic prefix.

According to another aspect of the present invention, a method of determining an interference between a primary network and a secondary network is provided. The method includes receiving a first signal of the primary network and a second signal of the secondary network; computing a correlation value of a first cyclic prefix included in the first signal and a correlation value of a second cyclic prefix included in the second signal; and determining an interference level or whether the interference occurs between the primary network and the secondary network based on the correlation value of the first cyclic prefix and the correlation value of the second cyclic prefix.

According to aspects of the present invention, an interference level, or whether an interference occurs between a primary network and a secondary network, may be determined based on cyclic prefixes included in received signals.

According to other aspects of the present invention, a first signal may be effectively identified without separately allocating a time slot for identifying the first signal.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
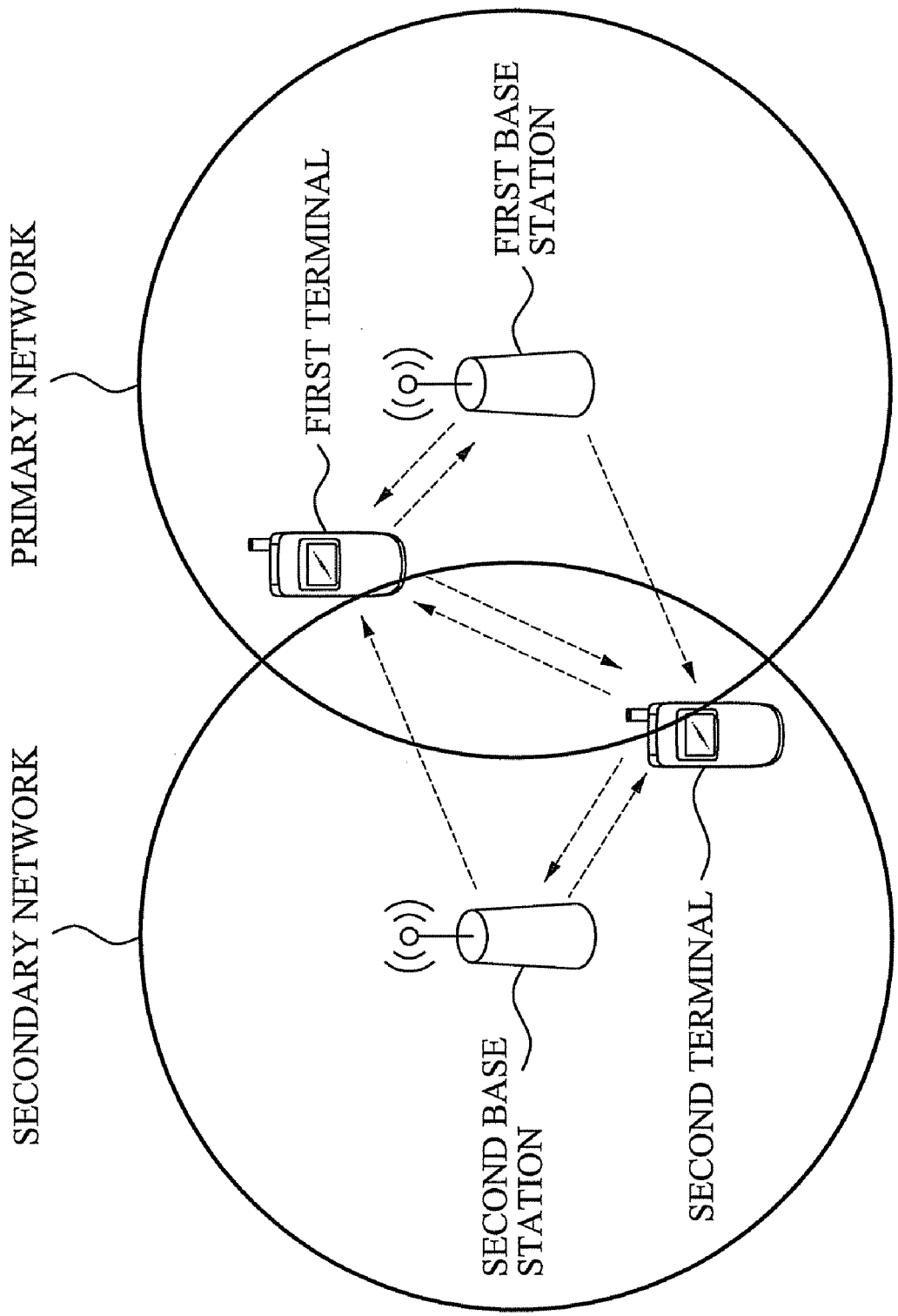
FIG. 1 illustrates an example of a primary network and a secondary network according to an embodiment of the present invention.

Reference will now be made in detail to present embodiments of the present invention, examples of which are illustrated in the accompanying drawings, wherein like reference numerals refer to the like elements throughout. The embodiments are described below in order to explain the present invention by referring to the figures.

FIG. 1 shows an example of a primary network and a secondary network according to an embodiment of the present invention. The primary network includes a first base station and a first terminal. The secondary network includes a second base station and a second terminal. The first base station, the first terminal, the second base station, and the second terminal may transmit and receive signals using an orthogonal frequency division multiplexing (OFDM) scheme.

The second terminal and the second base station may recognize, as an available frequency resource, a portion of frequency resources or complete frequency resources that are allocated to the primary network, using the cognitive radio technology. The second terminal and the second base station may transmit and receive a second signal between the second terminal and the second base station using the available frequency resource.

Specifically, the second terminal may transmit the second signal to the second base station in an uplink time using the available frequency resource. The second base station may transmit the second signal to the second terminal in a downlink time by using the available frequency resource. The first terminal and the first base station may independently use a pre-allocated frequency resource without considering whether the second terminal and the second base station transmits and receives the second signal.

The second signal transmitted from the second base station or the second terminal may be received by the first terminal or the first base station. When interference occurs in the first terminal and the first base station due to the second signal, or when an interference level is greater than a predetermined threshold, the first terminal and the first base station may not perform a normal communication operation. The first signal transmitted from the first terminal or the first base station may also act as the interference in the second terminal or the second base station.

Even though the second terminal and the second base station are using the available frequency resource, the first terminal and the first base station may have priority over the second terminal and the second base station regarding use of the available frequency resource. When the second signal operates as the interference in the first base station and the first terminal, or when the interference level is greater than the threshold, the second base station and the second terminal must change the available frequency resource in use or suspend a communication operation.

Figure 2:
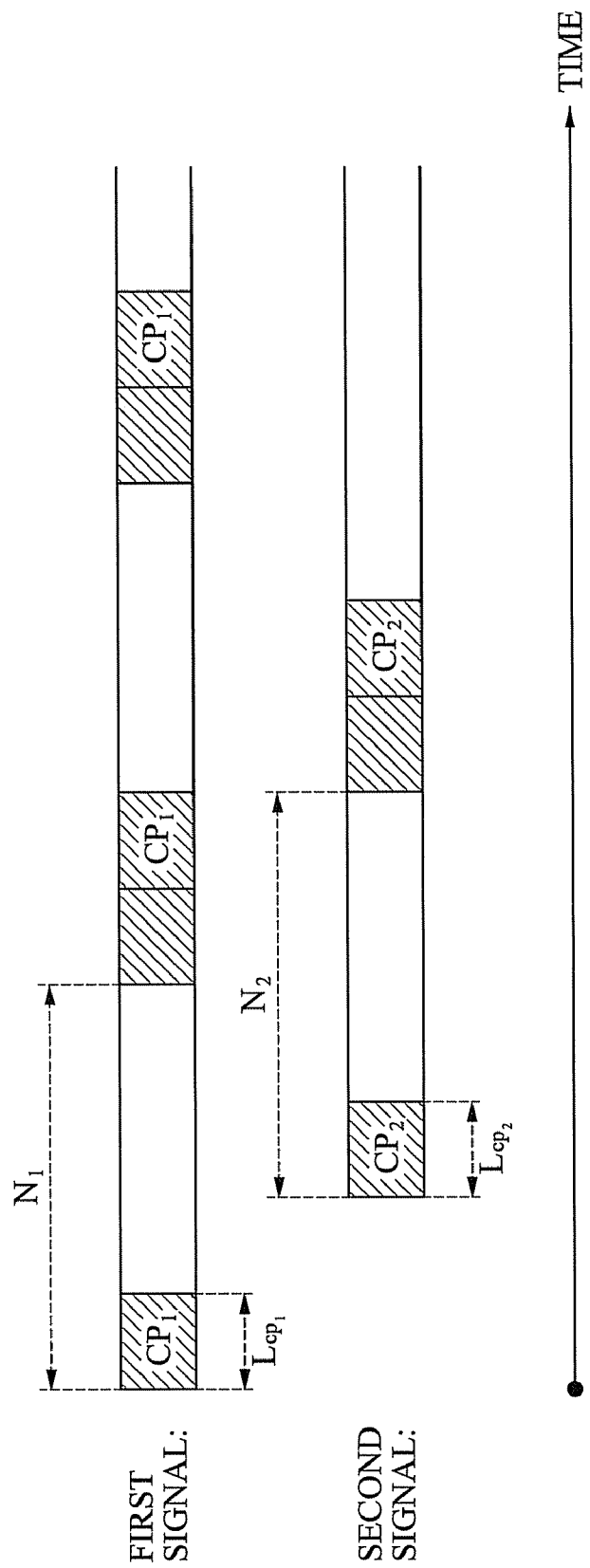
FIG. 2 illustrates an example of structure of a first signal and a second signal received in an interference determination apparatus according to an embodiment of the present invention.

FIG. 2 shows an example of structure of a first signal and a second signal received in an interference determination apparatus according to an embodiment of the present invention. The first signal and the second signal include cyclic prefixes CPs.

The first signal is a signal that is transmitted from the first terminal or the first base station. The second signal is a signal that is transmitted from the second terminal or the second base station. Generally, symbols that are encoded using an OFDM scheme include a guard interval in order to prevent interference that may occur between the symbols. A signal is inserted into the guard interval. This signal is referred to as a cyclic prefix. The cyclic prefix is generated by copying a signal of the last interval of valid symbol intervals and inserting the signal into the guard interval.

The length of a first cyclic prefix $CP_1$ included in the first signal is $L_{CP1}$, and the window length of a fast Fourier transform (FFT) of the first signal is $N_1$. The length of a second cyclic prefix $CP_2$ included in the second signal is $L_{CP2}$, and the window length of an FFT of the second signal is $N_2$.

According to an aspect of the present invention, the interference determination apparatus 300 is installed in the second terminal. When the second terminal determines that the first signal exists, or determines that the second signal interferes with a normal communication operation of the first terminal or the first base station, the second terminal should suspend a communication operation underway or change a frequency resource in use.

In addition to the existence of the second signal, the second terminal may determine whether the first signal exists using the feature of the cyclic prefix. The first signal includes the first cyclic prefix $CP_1$ in which the signal of the last interval in a data frame of the first signal is copied. The second signal includes the second cyclic prefix $CP_2$ in which the signal of the last interval in a data frame of the second signal is copied. The first cyclic prefix $CP_1$ is the same as the signal of the last interval in the data frame of the first signal. The second cyclic prefix $CP_2$ is the same as the signal of the last interval in the data frame of the second signal. Therefore, the second terminal may compute a correlation value of the first cyclic prefix $CP_1$ and a correlation value of the second cyclic prefix $CP_2$, and determine whether the first signal and the second signal exist.

When the first signal exists, a correlation value between the first cyclic prefix $CP_1$ and the signal of the last interval in the data frame of the first signal may be computed as a value greater than a particular level. When the second signal exists, a correlation value of the second cyclic prefix $CP_2$ may be computed as the value greater than the particular value. Therefore, when the first signal and the second signal exist, the second terminal may compute the correlation value of the first cyclic prefix $CP_1$ and the correlation value of the second cyclic prefix $CP_2$ as a value greater than the particular value.

For example, when a starting point of a correlation window is the same as a starting point of the first cyclic prefix $CP_1$, the correlation value between the first cyclic prefix $CP_1$ and the signal of the last interval in the data frame of the first signal may be theoretically '1'. When the starting point of the correlation window is the same as a starting point of the second cyclic prefix $CP_2$, a correlation value between the second cyclic prefix $CP_2$ and the signal of the last interval in the data frame of the second signal may also be theoretically '1'. Therefore, the second terminal may compute the correlation value of the first cyclic prefix $CP_1$ and the correlation value of the second cyclic prefix $CP_2$, and determine whether the first signal and the second signal exist.

Figure 3:
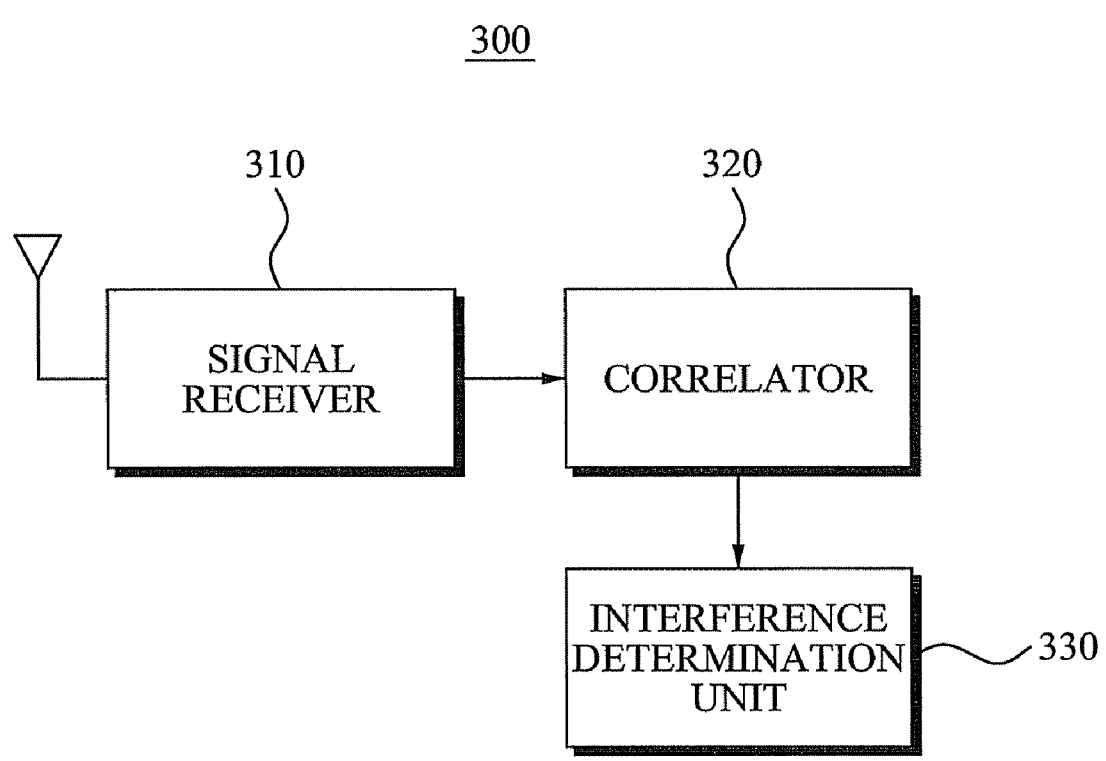
FIG. 3 is a block diagram illustrating an interference determination apparatus according to an embodiment of the present invention.

FIG. 3 shows an interference determination apparatus 300 according to an embodiment of the present invention. The interference determination apparatus 300 includes a signal receiver 310, a correlator 320, and an interference determination unit 330. According to other aspects of the present invention, the interference determination apparatus 300 may include additional and/or different units. Similarly, the functionality of two or more of the above units may be integrated into a single component.

The signal receiver 310 receives a first signal of a primary network and a second signal of a secondary network. The first signal may be a signal that is transmitted from a terminal or a base station belonging to the primary network. The second signal may be a signal that is transmitted from a terminal or a base station belonging to the secondary network.

The correlator 320 computes a correlation value of a first cyclic prefix included in the first signal and a correlation value of a second cyclic prefix included in the second signal. The correlator 320 may compute the correlation value of the first cyclic prefix and the correlation value of the second cyclic prefix using a length of the first cyclic prefix, a length of the second cyclic prefix, a window length of an FFT of the first signal, and a window length of an FFT of the second signal.

Referring to the first signal and the second signal shown in FIG. 2, the correlation value $R_1(n)$ of the first cyclic prefix and the correlation value $R_2(n)$ of the second cyclic prefix may be represented as $$R_1(n) = \frac{\left|\sum_{k=0}^{L_{CP1}-1} r*(n+k)r(n+k+N_1)\right|}{\sum_{k=0}^{L_{CP1}-1} |r(n+k+N_1)|^2}$$ [Equation 1]

$$R_2(n) = \frac{\left|\sum_{k=0}^{L_{CP2}-1} r*(n+k)r(n+k+N_2)\right|}{\sum_{k=0}^{L_{CP2}-1} |r(n+k+N_2)|^2},$$

where r(n) is a received signal that includes the first signal and the second signal, and n is an sample index.

The interference determination unit 330 determines an interference level or whether the interference occurs between the primary network and the secondary network based on the correlation value of the first cyclic prefix and the correlation value of the second cyclic prefix. According to an aspect of the present invention, the interference determination unit 330 may determine the interference level or whether the interference occurs between the primary network and the secondary network based on a pattern according to a time of the correlation value of the first cyclic prefix and the correlation value of the second cyclic prefix.

While the first signal and the second signal are being received, the correlation value of the first cyclic prefix and the correlation value of the second cyclic prefix may be computed as a value greater than a particular value. Specifically, the correlation value of the first cyclic prefix may be computed as the value greater than the particular value for each time $N_1$. The correlation value of the second cyclic prefix may be computed as the value greater than the particular level for each time $N_2$. The interference determination unit 330 may determine the interference level or whether the interference occurs between the primary network and the secondary network based on a pattern of periodically changing the correlation value of the first cyclic prefix and the correlation value of the second cyclic prefix.

According to an aspect of the present invention, the interference determination unit 330 may compare the correlation value of the first cyclic prefix with the correlation value of the second cyclic prefix, and determine the interference level or whether the interference occurs between the primary network and the secondary network based on the result of comparison. For example, when the correlation value is computed as '0.8', greater than a predetermined threshold, for each time $N_1$, the interference determination unit 330 may identify the existence of the first cyclic prefix and the existence of the first signal, and determine the interference level or whether the interference occurs between the primary network and the secondary network.

When the interference occurs between the primary network and the secondary network, or when the interference level is greater than a predetermined threshold, the interference determination unit 330 may generate an alarm signal. When the generated alarm signal is transmitted to the second terminal or the second base station, the second terminal or the second base station may suspend the communication operation underway or change the frequency resource in use.

The first signal may include a first processing cyclic prefix and the second signal may include a second processing cyclic prefix. The first processing cyclic prefix is generated by processing the first cyclic prefix using a first processing code. The second processing cyclic prefix is generated by processing the second cyclic prefix using a second processing code. The correlator 320 may compute a correlation value of the first processing cyclic prefix and a correlation value of the second processing cyclic prefix. The interference determination unit 330 may determine the interference level or whether the interference occurs between the primary network and the secondary network, using the correlation value of the first processing cyclic prefix and the correlation value of the second processing cyclic prefix. Descriptions related thereto will be made in detail with reference to FIGS. 7 through 9.

Figure 4:
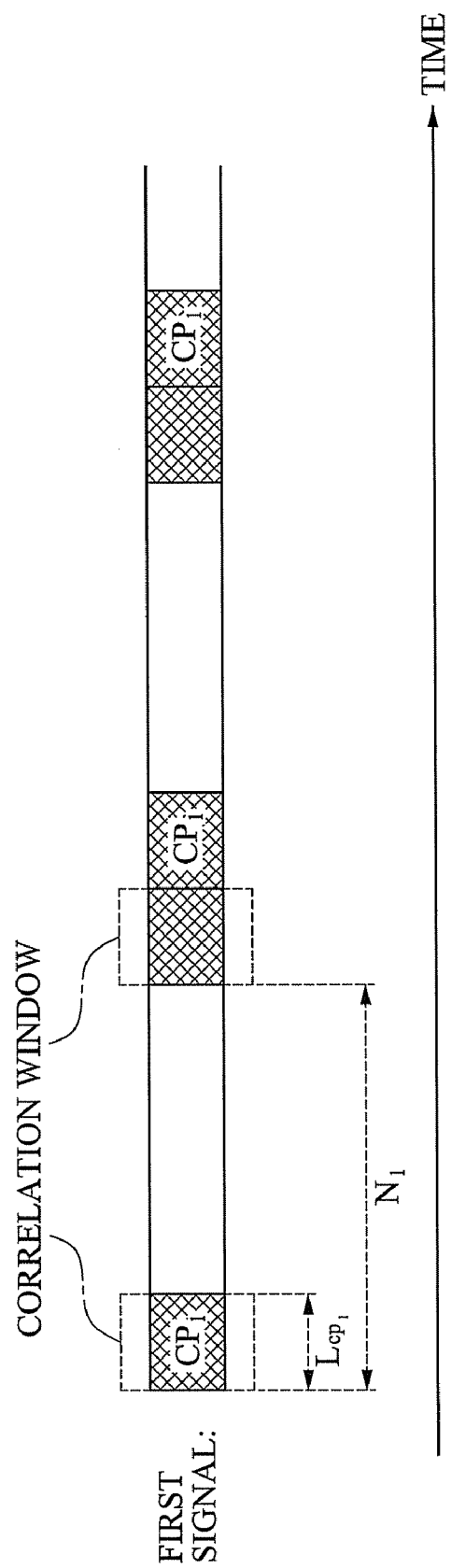
FIG. 4 illustrates an example of a first signal when a starting point of a correlation window is the same as a starting point of a first cyclic prefix according to an embodiment of the present invention.

FIG. 4 shows an example of a first signal when a starting point of a correlation window is the same as a starting point of a first cyclic prefix according to an embodiment of the present invention. As shown in FIG. 4, the starting point of the correlation window is the same as the starting of the first cyclic prefix. Also, $r(n+k)=r(n+k+N_1)$. Therefore, when using Equation 1 above, the correlation value $R_1(n)$ of the first cyclic prefix may be represented as $$R_1(n) = \frac{\left|\sum_{k=0}^{L_{CP1}-1} r*(n+k)r(n+k+N_1)\right|}{\sum_{k=0}^{L_{CP1}-1} |r(n+k+N_1)|^2}$$ [Equation 2]

$$= \frac{\left|\sum_{k=0}^{L_{CP1}-1} r*(n+k)r(n+k)\right|}{\sum_{k=0}^{L_{CP1}-1} |r(n+k+N_1)|^2}$$

$$= 1.$$

Referring to Equation 2, when the starting point of the correlation window is the same as the starting point of the first cyclic prefix, the correlation value of the first cyclic prefix is theoretically '1'. Therefore, when the correlator 320 temporally moves the correlation window and performs computation while the first signal is being received, and in this instance, the starting point of the correlation window is the same as the starting point of the first cyclic prefix, the correlation value of the first cyclic prefix may be computed as '1'. Also, when the correlator 320 performs computations during a long period of time, the correlation value of the first cyclic prefix may be periodically '1' for each time $N_1$. Although not shown in FIG. 4, the correlation value of the second cyclic prefix may be periodically '1' for each time $N_2$.

Figure 5:
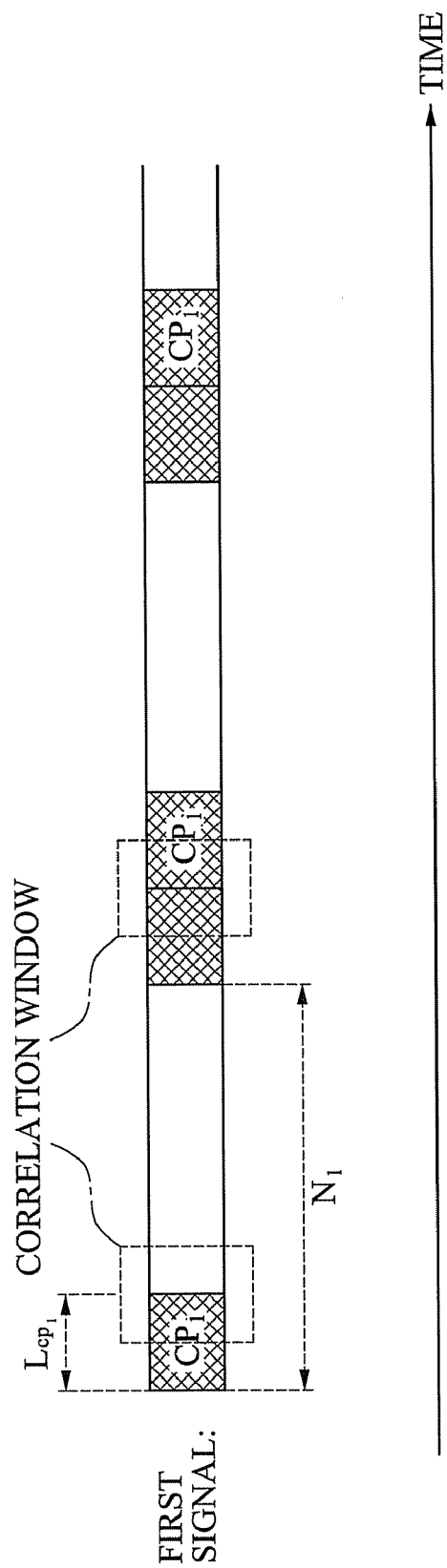
FIG. 5 illustrates an example of a first signal when a starting point of a correlation window is different from a starting point of a first cyclic prefix according to an embodiment of the present invention.

FIG. 5 shows an example of a first signal when a starting point of a correlation window is different from a starting point of a first cyclic prefix according to an embodiment of the present invention. The starting point of the correlation window is different from the starting point of the first cyclic prefix. As shown in FIG. 5, a correlation value with respect to a portion where the correlation window and the first cyclic prefix are duplicated may be computed as a value greater than the particular level. Conversely, a correlation value with respect to an unduplicated portion may be computed as nearly '0' or a very small value. The correlation value of the first cyclic prefix may be computed as a value less than '1', as given by $$R_1(n) = \frac{\left|\sum_{k=0}^{L_{CP1}-1} r*(n+k)r(n+k+N_1)\right|}{\sum_{k=0}^{L_{CP1}-1} |r(n+k+N_1)|^2} < 1.$$

[Equation 3]

Referring to Equation 2 and Equation 3 above, the computed correlation value of the first cyclic prefix and the correlation value of the second cyclic prefix may change depending on the starting location of the correlation window. Whether the first signal and the second signal exist may be determined using a change pattern.

Figure 6:
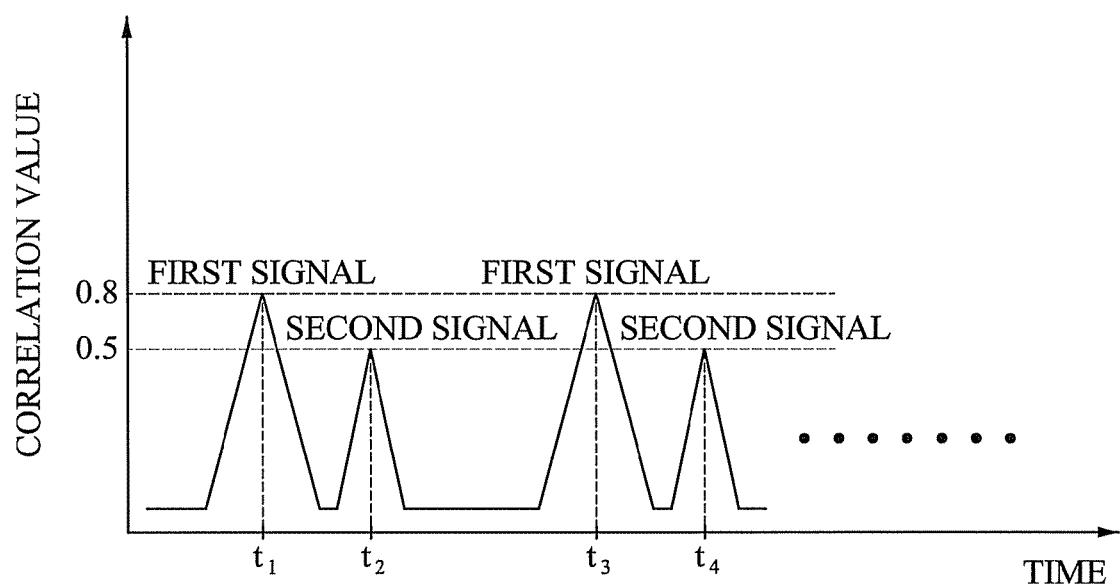
FIG. 6 illustrates an example of a correlation value of a first cyclic prefix and a correlation value of a second cyclic prefix according to an embodiment of the present invention.

FIG. 6 shows an example of a correlation value of a first cyclic prefix and a correlation value of a second cyclic prefix according to an embodiment of the present invention. The correlation value may be computed as '0.8' at time $t_1$ and $t_3$. The correlation value may be computed as '0.5' at time $t_2$ and $t_4$. Although not shown in FIG. 6, a time interval between time $t_1$ and $t_3$ may be $N_1$, the window length of the FFT of the first signal. A time interval between time $t_2$ and $t_4$ may be $N_2$, the window length of the FFT of the second signal. Accordingly, although not shown in FIG. 6, if the first signal and the second signal continuously exist, the correlation value may be computed as '0.8' at time $t_5$ that passes from time $t_3$ by time $N_1$, and may be computed as '0.5' at time $t_6$ that passes from time $t_4$ by time $N_1$.

Whether the first signal and the second signal exist may be determined using the pattern according to the time of the correlation value. The interference level of interference that occurs between the primary network and the secondary network may be determined by comparing the size of computed correlation values.

Figure 7:
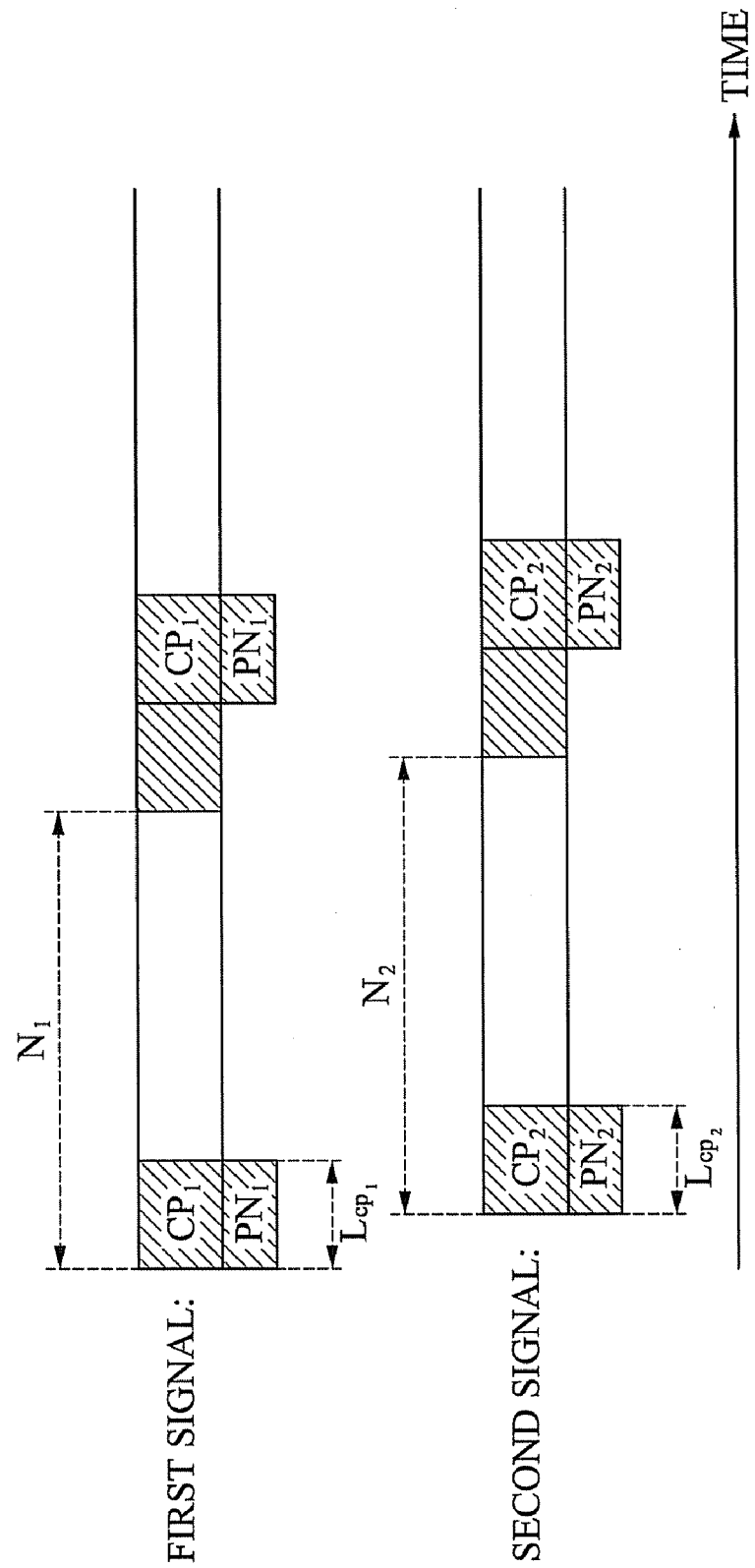
FIG. 7 illustrates an example of a first signal including a first processing cyclic prefix and a second signal including a second processing cyclic prefix according to an embodiment of the present invention.

FIG. 7 shows an example of a first signal including a first processing cyclic prefix and a second signal including a second processing cyclic prefix according to an embodiment of the present invention. The first processing cyclic prefix is generated by processing the first cyclic prefix $CP_1$ using a first processing code $PN_1$. The second processing cyclic prefix is generated by processing the second cyclic prefix $CP_2$ using a second processing code $PN_2$. The first processing code $PN_1$ is a first pseudo-noise code corresponding to the primary network and the second processing code $PN_2$ is a second pseudo-noise code corresponding to the secondary network.

When the first cyclic prefix and the second cyclic prefix overlap and cause interference, the accuracy of a computed correlation value of the first cyclic prefix and a correlation value of the second cyclic prefix may decrease. For example, in the change pattern of the correlation value according to time, the correlation value of the first cyclic prefix and the correlation value of the second cyclic prefix may be in a spread form over time, instead of a peak form. This is because the first cyclic prefix and the second cyclic prefix overlap. It may therefore be difficult to determine whether the first signal and the second signal exist using the correlation value of the first cyclic prefix and the correlation value of the second cyclic prefix.

According to an aspect of the present invention, the first processing cyclic prefix and the second processing cyclic prefix, which are processed using unique processing codes, may be used. Therefore, even though the processed first processing cyclic prefix and the second processing cyclic prefix overlap, it is possible to more accurately compute correlation values.

The correlation value of the first processing cyclic prefix and the correlation value of the second processing cyclic prefix may be represented as $$R_1(n) = \frac{\left|\sum_{k=1}^{L_{CP1}} r*(n+k)r(n+k+N_1)p_1(k)\right|}{\sum_{k=1}^{L_{CP1}} |r(n+k+N_1)|^2}$$

[Equation 4]

$$R_2(n) = \frac{\left|\sum_{k=1}^{L_{CP2}} r*(n+k)r(n+k+N_2)p_2(k)\right|}{\sum_{k=1}^{L_{CP2}} |r(n+k+N_2)|^2},$$

where $P_1(k)$ is a $k^{th}$ element of the first processing code and $P_2(k)$ is a $k^{th}$ element of the second processing code.

Figure 8:
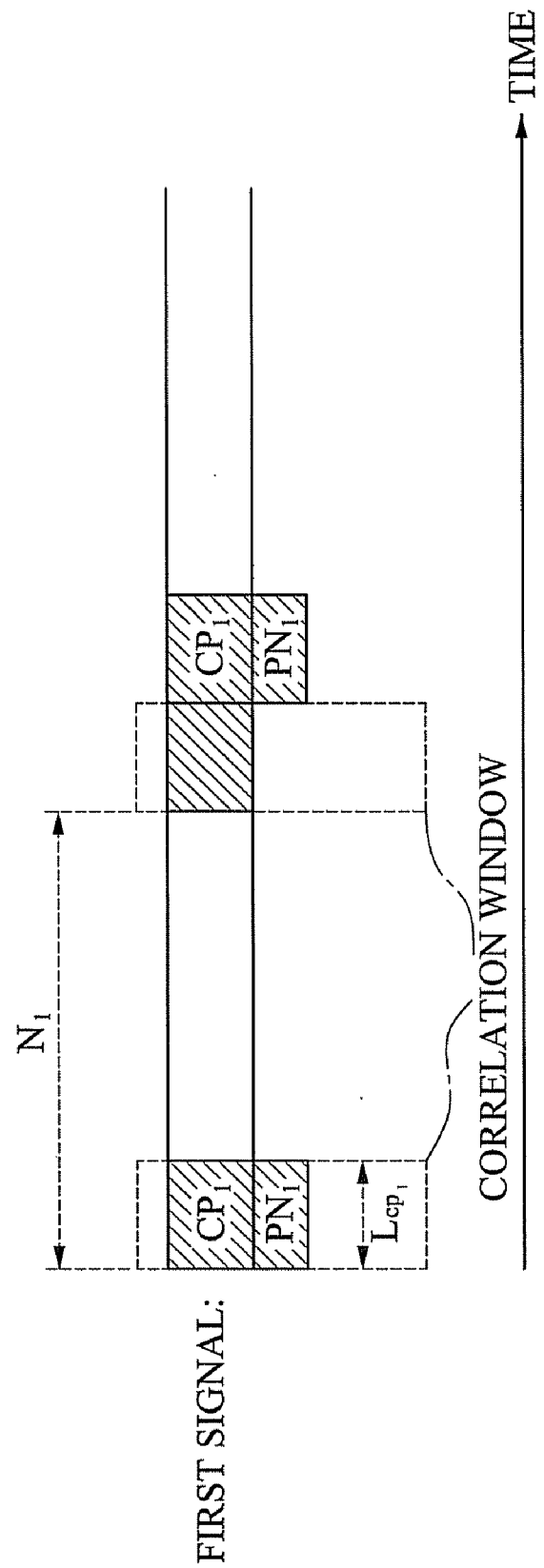
FIG. 8 illustrates an example of a first signal including a first processing cyclic prefix when a starting point of a correlation window is the same as a starting point of the first processing cyclic prefix according to an embodiment of the present invention.

FIG. 8 shows an example of a first signal including a first processing cyclic prefix when a starting point of a correlation window is the same as a starting point of the first processing cyclic prefix according to an embodiment of the present invention. The first processing cyclic prefix is generated by processing a first cyclic prefix $CP_1$ using a first processing code $PN_1$. Therefore, in the correlation window, a left signal may be different from a right signal.

When the left signal in the correlation window is $r_1(n)$ and the right signal in the correlation window is $r_2(n+N_1)$, the relationship between $r_1(n)$ and $r_2(n+N_1)$ may be represented as $$r_1(n)=r_2(n+N_1)*p_1(n).$$ [Equation 5]

When the starting point of the correlation window is the same as the starting point of the first processing cyclic prefix, the result that is obtained by multiplying $r_2(n+N_1)$ by the same first processing code $PN_1$ is the same as $r_1(n)$. This is because $r_1(n)$ is processed using the first processing code $PN_1$.

When the starting point of the correlation window is the same as the starting point of the first processing cyclic prefix, sample index (n) may be set to '0'. Therefore, the correlation value of the first processing cyclic prefix may be represented as $$R_1(n)_{n=0} = \frac{\left|\sum_{k=1}^{L_{CP1}} r_1*(n+k)r_2(n+k+N_1)p_1(k)\right|}{\sum_{k=1}^{L_{CP1}} |r_1(n+k)|^2}$$

$$= \frac{\left|\sum_{k=1}^{L_{CP1}} (r_2(n+k+N_1)p_1(k))*r_2(n+k+N_1)p_1(k)\right|}{\sum_{k=1}^{L_{CP1}} |r_1(n+k)|^2}$$

[Equation 6]

-continued $$= \frac{\left|\sum_{k=1}^{L_{CP1}} |p_1(k)|^2 |r_2(n+k+N_1)|^2\right|}{\sum_{k=1}^{L_{CP1}} |r_1(n+k)|^2}$$

$$= 1.$$

Even though the first processing cyclic prefix and the second processing cyclic prefix overlap, the correlation window may move over time. Through this, when the starting point of the correlation window is the same as the starting point of the first processing cyclic prefix, the correlation value of the first processing cyclic prefix may be computed to be in the peak form. Even though not shown in FIG. 8, the correlation value of the second processing cyclic prefix may be computed through the same computation process as the correlation value of the first processing cyclic prefix.

Figure 9:
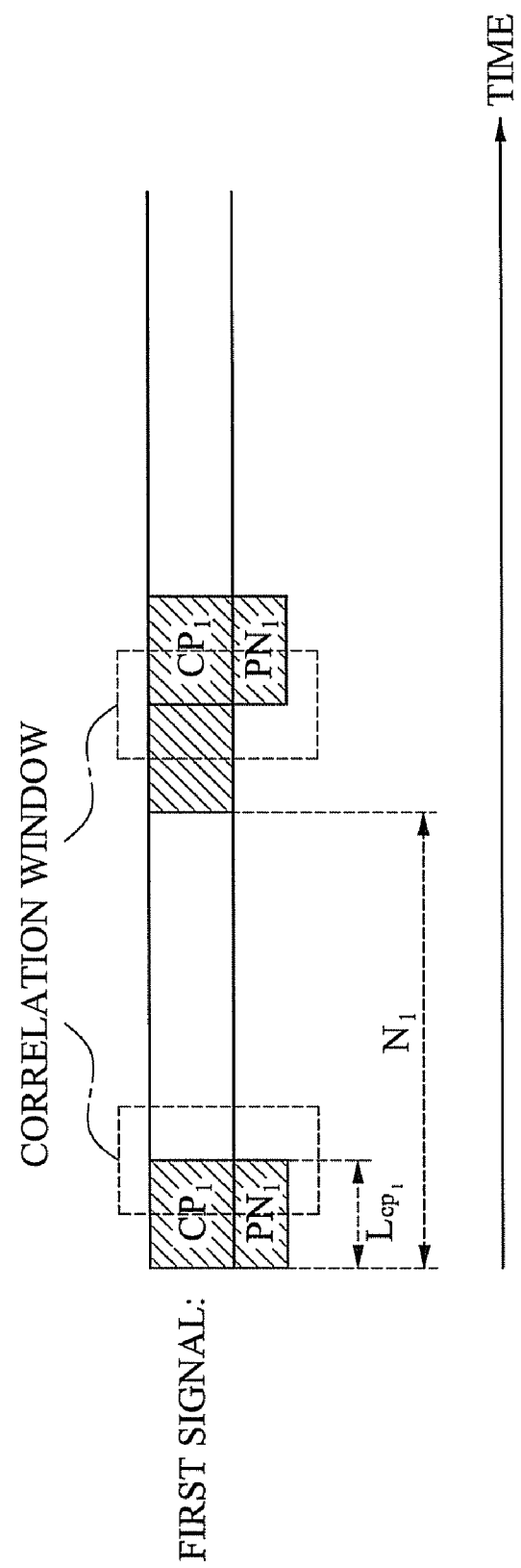
FIG. 9 illustrates an example of a first signal including a first processing cyclic prefix when a starting point of a correlation window is different from a starting point of a first processing cyclic prefix according to an embodiment of the present invention.

FIG. 9 shows an example of a first signal including a first processing cyclic prefix when a starting point of a correlation window is different from a starting point of a first processing cyclic prefix according to an embodiment of the present invention. When the starting point of the correlation window is different from the starting point of the first processing cyclic prefix, the correlation value of the first processing cyclic prefix may be computed using Equation 4 above and be represented as $$R_1(n) = \frac{\left|\sum_{k=1}^{l<L_{CP1}} r_1*(n+k)r_2(n+k+N_1)p_1(k)\right|}{\sum_{k=1}^{L_{CP1}} |r_1(n+k)|^2}$$ [Equation 7]

$$= \frac{\left|\sum_{k=1}^{l<L_{CP1}} (r_2(n+k+N_1)p_1(n+k))*\right|}{\sum_{k=1}^{L_{CP1}} |r_1(n+k)|^2}$$

$$= \frac{\left|\sum_{k=1}^{l<L_{CP1}} |r_2(n+k+N_1)|^2 p_1(n+k)p_1(k)\right|}{\sum_{k=1}^{L_{CP1}} |r_1(n+k)|^2} <<< 1.$$

Referring to Equation 7, when the starting point of the correlation window is different from the starting point of the first processing cyclic prefix, n is not '0' and thus, $p_1(n+k)p_1(k)$ is computed as a value less than '1'. Therefore, the correlation value of the first processing cyclic prefix is computed as a very small value less than '1'.

Consequently, only when the starting point of the correlation window is the same as the starting point of the first processing cyclic prefix, may the correlation value be computed as a value greater than a particular level. Conversely, when the starting point of the correlation window is even a little different from the starting point of the first processing cyclic prefix, the correlation value may be computed as a very small value.

Accordingly, even though the first processing cyclic prefix and the second processing cyclic prefix overlap, the correlation value of the first processing cyclic prefix and the correlation value of the second processing cyclic prefix may have values in the peak form over time due to the first processing code and the second processing code. Therefore, it is possible to effectively determine whether the first signal and the second signal exist. Although not shown in FIG. 9, the correlation value of the second processing cyclic prefix may be computed through the same computation process of the correlation value of the first processing cyclic prefix.

Figure 10:
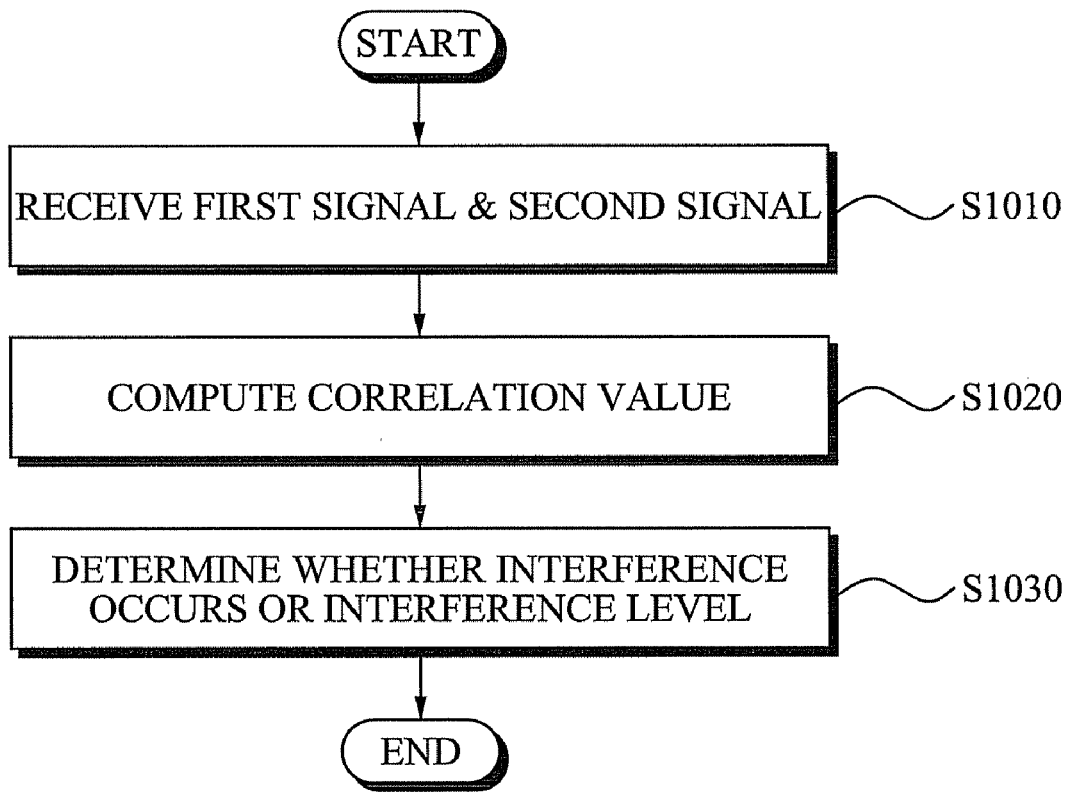
FIG. 10 is a flowchart illustrating a process of determining an interference according to an embodiment of the present invention.

FIG. 10 is a flowchart of a process of determining an interference according to an embodiment of the present invention. In operation S1010, a first signal of a primary network and a second signal of a secondary network is received. In operation S1020, a correlation value of a first cyclic prefix included in the first signal and a correlation value of a second cyclic prefix included in the second signal is computed. In operation S1030, an interference level or whether the interference occurs between the primary network and the secondary network is determined using the correlation value of the first cyclic prefix and the correlation value of the second cyclic prefix.

According to an aspect of the present invention, operation S1030 may include determining the interference level or whether the interference occurs between the primary network and the secondary network based on a pattern according to a time of the correlation value of the first cyclic prefix and the correlation value of the second cyclic prefix. According to another aspect of the present invention, when the interference occurs between the primary network and the secondary network, or when the interference level is greater than a predetermined threshold, operation S1030 may include generating an alarm signal. According to another aspect of the present invention, operation S1030 may include comparing the correlation value of the first cyclic prefix with the correlation value of the second cyclic prefix, and determining the interference level or whether the interference occurs between the primary network and the secondary network based on the result of the comparison.

According to another aspect of the present invention, the first signal may include a first processing cyclic prefix and the second signal may include a second processing cyclic prefix. The first processing cyclic prefix may be generated by processing the first cyclic prefix using a first processing code, and the second processing cyclic prefix may be generated by processing the second cyclic prefix using a second processing code. Operation S1020 may include computing a correlation value of the first processing cyclic prefix and a correlation value of the second processing cyclic prefix. Operation S1030 may include determining the interference level or whether the interference occurs between the primary network and the secondary network based on the correlation value of the first processing cyclic prefix and the correlation value of the second processing cyclic prefix.

Aspects of the present invention can also be embodied as computer-readable codes on a computer-readable recording medium and can be realized in a common digital computer executing the program using a computer-readable recording medium. The computer-readable recording medium is any data storage device that can store data which can be thereafter read by a computer system. Examples of the computer-readable recording medium include read-only memory (ROM), random-access memory (RAM), CDs, DVDs, Blu-ray discs, magnetic tapes, floppy disks, and optical data storage devices. Aspects of the present invention may also be embodied in a computer data signal embodied in a carrier wave comprising a compression source code segment and an encryption source code segment (such as data transmission through the Internet). The computer-readable recording medium can also be distributed over network coupled computer systems so that the computer-readable code is stored and executed in a distributed fashion. Moreover, the hard disk drive can be used with a computer, can be a portable drive, and/or can be used with a media player.

Although a few embodiments of the present invention have been shown and described, it would be appreciated by those skilled in the art that changes may be made in this embodiment without departing from the principles and spirit of the invention, the scope of which is defined by the claims and their equivalents.

What is claimed is:

1. An apparatus to determine an interference between a primary network and a secondary network, the apparatus comprising:
   a signal receiver to receive a first signal of the primary network and a second signal of the secondary network;
   a correlator to compute a correlation value of a first cyclic prefix included in the first signal and a correlation value of a second cyclic prefix included in the second signal; and
   an interference determination unit to determine an interference level or whether the interference occurs between the primary network and the secondary network based on the correlation value of the first cyclic prefix and the correlation value of the second cyclic prefix.

2. The apparatus as claimed in claim 1, wherein:
   the first signal includes a first processing cyclic prefix and the second signal includes a second processing cyclic prefix, the first processing cyclic prefix is generated by processing the first cyclic prefix using a first processing code;
   the second processing cyclic prefix is generated by processing the second cyclic prefix using a second processing code;
   the correlator computes a correlation value of the first processing cyclic prefix and a correlation value of the second processing cyclic prefix; and
   the interference determination unit determines the interference level or whether the interference occurs between the primary network and the secondary network based on the correlation value of the first processing cyclic prefix and the correlation value of the second processing cyclic prefix.

3. The apparatus as claimed in claim 2, wherein the first processing code is a first pseudo-noise code corresponding to the primary network and the second processing code is a second pseudo-noise code corresponding to the secondary network.

4. The apparatus as claimed in claim 1, wherein the interference determination unit determines the interference level or whether the interference occurs between the primary network and the secondary network based on a pattern according to a time of the correlation value of the first cyclic prefix and the correlation value of the second cyclic prefix.

5. The apparatus as claimed in claim 1, wherein, when the interference occurs between the primary network and the secondary network, or when the interference level is greater than a predetermined threshold, the interference determination unit generates an alarm signal.

6. The apparatus as claimed in claim 5, wherein the alarm signal is transmitted to a terminal of the secondary network and the terminal of the secondary network either uses an updated wireless resource or suspends a communication operation.

7. The apparatus as claimed in claim 1, wherein the interference determination unit compares the correlation value of the first cyclic prefix with the correlation value of the second cyclic prefix, and determines the interference level or whether the interference occurs between the primary network and the secondary network based on the result of the comparison.

8. The apparatus as claimed in claim 1, wherein the correlator computes the correlation value of the first cyclic prefix and the correlation value of the second cyclic prefix using a length of the first cyclic prefix, a length of the second cyclic prefix, a window length of a fast Fourier transform (FFT) of the first signal, and/or a window length of an FFT of the second signal.

9. The apparatus as claimed in claim 1, wherein the first signal and the second signal are encoded using an orthogonal frequency division multiplexing (OFDM) scheme.

10. The apparatus as claimed in claim 1, wherein:
    the first signal includes either a downlink signal or an uplink signal of the primary network; and
    the second signal includes either a downlink signal or an uplink signal of the secondary network.

11. The apparatus as claimed in claim 1, wherein the primary network has priority over the secondary network regarding use of a wireless resource.

12. A method of determining an interference between a primary network and a secondary network, the method comprising:
    receiving a first signal of the primary network and a second signal of the secondary network;
    computing a correlation value of a first cyclic prefix included in the first signal and a correlation value of a second cyclic prefix included in the second signal; and
    determining an interference level or whether the interference occurs between the primary network and the secondary network based on the correlation value of the first cyclic prefix and the correlation value of the second cyclic prefix.

13. The method as claimed in claim 12, wherein:
    the first signal includes a first processing cyclic prefix and the second signal includes a second processing cyclic prefix;
    the first processing cyclic prefix is generated by processing the first cyclic prefix using a first processing code;
    the second processing cyclic prefix is generated by processing the second cyclic prefix using a second processing code;
    the computing of the correlation value comprises computing a correlation value of the first processing cyclic prefix and a correlation value of the second processing cyclic prefix; and
    the determining of the interference comprises determining the interference level or whether the interference occurs between the primary network and the secondary network based on the correlation value of the first processing cyclic prefix and the correlation value of the second processing cyclic prefix.

14. The method as claimed in claim 12, wherein the determining of the interference comprises determining the interference level or whether the interference occurs between the primary network and the secondary network based on a pattern according to a time of the correlation value of the first cyclic prefix and the correlation value of the second cyclic prefix.

15. The method as claimed in claim 12, wherein, when the interference occurs between the primary network and the secondary network, or when the interference level is greater than a predetermined threshold, the determining of the interference comprises generating an alarm signal.

16. The method as claimed in claim 12, wherein the determining of the interference level comprises:

comparing the correlation value of the first cyclic prefix with the correlation value of the second cyclic prefix; and determining the interference level or whether the interference occurs between the primary network and the secondary network based on the result of the comparison.

17. A non-transitory computer-readable recording medium storing a program to implement a method of determining an interference between a primary network and a secondary network, the method comprising:

receiving a first signal of the primary network and a second signal of the secondary network;

computing a correlation value of a first cyclic prefix included in the first signal and a correlation value of a second cyclic prefix included in the second signal; and determining an interference level or whether the interference occurs between the primary network and the secondary network based on the correlation value of the first cyclic prefix and the correlation value of the second cyclic prefix.

* * * * *